United States Patent
Bennison

[11] Patent Number: 5,967,739
[45] Date of Patent: Oct. 19, 1999

[54] BAGGAGE HANDLING DEVICE

[75] Inventor: Stewart Bennison, Chesterfield, United Kingdom

[73] Assignee: Palamatic Handling Systems Ltd., Chesterfield, United Kingdom

[21] Appl. No.: 08/965,951

[22] Filed: Nov. 7, 1997

[30] Foreign Application Priority Data

Nov. 8, 1996 [GB] United Kingdom ............... 9623306

[51] Int. Cl.$^6$ .................................................. B66C 23/36
[52] U.S. Cl. ............................ 414/744.3; 294/2; 901/46; 414/917
[58] Field of Search ................... 414/917, 731, 414/736, 744.3; 294/2; 212/330, 331, 332, 333, 334; 901/46

[56] References Cited

U.S. PATENT DOCUMENTS

| | | | |
|---|---|---|---|
| 2,783,078 | 2/1957 | Biller | 294/2 |
| 2,861,700 | 11/1958 | James | 212/334 |
| 3,033,381 | 5/1962 | Noble et al. | 212/333 |
| 3,721,416 | 3/1973 | Goudreau | 414/917 |
| 4,068,763 | 1/1978 | Fletcher et al. | |
| 4,850,627 | 7/1989 | Franklin | 294/2 |
| 4,964,302 | 10/1990 | Grahn et al. | 901/46 |
| 5,203,837 | 4/1993 | Madic et al. | 414/917 |
| 5,269,644 | 12/1993 | Vatel | 414/744.3 |
| 5,609,377 | 3/1997 | Tanaka et al. | 901/46 |
| 5,752,729 | 5/1998 | Crozier et al. | 294/2 |

FOREIGN PATENT DOCUMENTS

| | | |
|---|---|---|
| 0169156 | 1/1986 | European Pat. Off. . |
| 3344903 | 6/1985 | Germany . |
| 9112755 | 4/1992 | Germany . |
| 4122953 | 1/1993 | Germany . |
| 1154974 | 6/1969 | United Kingdom . |
| 81/02289 | 8/1981 | WIPO . |

*Primary Examiner*—Christopher P. Ellis
*Assistant Examiner*—Gregory A. Morse
*Attorney, Agent, or Firm*—Trexler, Bushnell, Giangiorgi & Blackstone, Ltd.

[57] ABSTRACT

A baggage handling device (1) comprising, in combination, a vacuum gripping foot (2) and a non-vacuum, mechanical engagement device (3) such as a simple hook or a power operated claw (4), with an operator activated control device to select either the vacuum gripping foot (2), or the mechanical device (3) as appropriate, for any particular item of baggage; with a powered hoisting an operator activated control device (6) to raise and lower the duplex unit (2, 3), as necessary in a baggage handling sequence.

15 Claims, 8 Drawing Sheets

BAGGAGE HANDLING DEVICE

BACKGROUND OF THE INVENTION

This invention relates to a baggage handling device, particularly but not exclusively, for use at Airports.

Automation of baggage handing, whilst desirable, is difficult to achieve because of the diversity of shapes, sizes, and nature of the "baggage" involved, and consequently has tended to remain a predominantly manual operation.

A vacuum gripping head is suitable for the majority of types of baggage that can ordinarily be expected to be handled, such as hard or soft skin cases, cartons, boxes etc., that have a planar area that can be engaged by the head. However, occasionally, misaligned baggage can have a disposition making it difficult if not impossible to apply the suction foot, and there is a minority of baggage to be handled of a non-standard shape not displaying a planar face, e.g. golf bags, and which a suction head cannot be applied in which case the operator would deploy and use the mechanical lifting device.

SUMMARY OF THE INVENTION

According to the present invention, there is provided a baggage handling device comprising, in combination, a vacuum gipping foot and a non-vacuum, mechanical engagement device such as a simple hook or a power operated claw, with means to select either the vacuum gripping foot, or the mechanical device as appropriate, for engaging any particular item of baggage, and with a powered lifting means to raise and lower the duplex unit of vacuum foot and mechanical device, as necessary in a baggage handling sequence.

Thus, with baggage in the form of, e.g. golf club bags that cannot be handled by a vacuum gripping foot, there is inevitably a handle or loop on it that can be accessed by the gripper, whereby the bag can be lifted and lowered as required. Equally, with a misaligned item of luggage, the likelihood is that even if a planar face is not accessible by the suction foot, the luggage will have a handle or strap that can be accessed by the gripper.

The mechanical device may be displaceable between an inactive, storage position and a deployed, operable position, with displacement preferably effected by power means, conveniently in the form of a piston and cylinder unit, which is preferably double-acting and is preferably pneumatically operated.

In one embodiment the device may be fully manually operable and manually manoeuvred in its baggage handling sequence. In another embodiment, the duplex unit may be attached to a robot arm. A sonic and/or proximity and/or photoelectric sensor type device and/or a vision and camera system can be mounted or adjacent the duplex unit, with information from the sensor(s) being passed to a computerised control system where a memory unit can compare and interpret information to direct the robot arm and device to achieve the baggage handling sequence required.

The robot arm system can be set to operate fully automatically or may be fitted with a manual interface so that a combination of automatic sequence movements and the involvement of an operator located remotely from the robot, but observing the operation on a monitor screen, can manually direct or override the operating sequence via for instance, a joy-stick type device at a control console.

The robot arm system alternatively can be set to operate via a joy-stick type device alone with only a video camera mounted on the duplex device to provide feed-back to the operator who could be local to, or remote from, the robot arm device.

In one embodiment the duplex unit is attached to a rigid support arm or to a robot arm, while such attachment may be via a pivot. The rigid support arm is preferably "L"-shaped and is connected to the powered lifting device the latter, in this embodiment, preferably comprising a parallel linkage mechanism carried by a support structure, e.g. a pillar bolted to the ground, with power means operable on the mechanism, e.g. by being pivotally connected between one link of the parallel linkage mechanism and the pillar.

In another embodiment the powered lifting device could be a vacuum lifting device, e.g. as described in GB 2080764, comprising a variable length lift tube subjectable to a vacuum and terminating at its lower end in a suction foot adapted to engage the item to be lifted, with a manoeuving handle and a control valve, hand-operable by the user to maintain, partially destroy, or full destroy, the vacuum within the lift tube, depending on the function required. Alternatively, the powered lifting means could be a balancer, of the electronic or pneumatically powered type.

With the mechanical engagement device in the form of a powered claw at least two oppositely disposed claws subjectable to a powered drive mechanism, operable by the user, are provided, to enable the claws to be powered between open and closed positions to grip and release an item of baggage. Preferably, three interdigitating claws are provided and are simultaneously drivable between open and closed positions. Preferably, the mechanical device is in its non-operative, storage position, located within the lower end of the lift tube, being co-axial therewith, or generally so.

Preferably, user-operable control means for deploying the vacuum gripping foot, and possibly also for activating the claws, comprises a twist grip providing a first degree of twist for deployment and, if required, a further degree of twist for activation of the claws.

BRIEF DESCRIPTION OF THE DRAWINGS

The invention will now be described in greater detail, by way of examples, with reference to the accompanying drawings, in which.

DESCRIPTION OF THE PREFERRED EMBODIMENTS

In all figures, like components are accorded like reference numerals.

A baggage handling device 1 comprises, in combination, a vacuum gripping foot 2 and a non-vacuum, mechanical engagement device 3. The latter could simply be a hook or, as illustrated, a power operated claw 4. User operable means 5 are provided to select either the vacuum gripping foot 2, or the mechanical device 3 as appropriate, for any particular item of baggage to be handled, whilst a powered hoisting means 6 also under the control of the operator is provided to raise and lower the duplex unit 2, 3 as necessary, in a baggage handling sequence In the embodiment of FIGS. 1 to 4, the duplex unit 2, 3, is pivotally suspended on axis 7, from the powered lifting means 6 which takes the form of an "L"-shaped arm 8 connected by parallel links 9 to a pillar 10 bolted to the ground, with linkage movements, and hence movement of the duplex unit 2, 3, controlled by a single or double-acting pneumatic, or hydraulic piston and cylinder unit 11 pivotally attached at one end to the pillar 10, and at the other end to the upper link 9.

Figure 1:
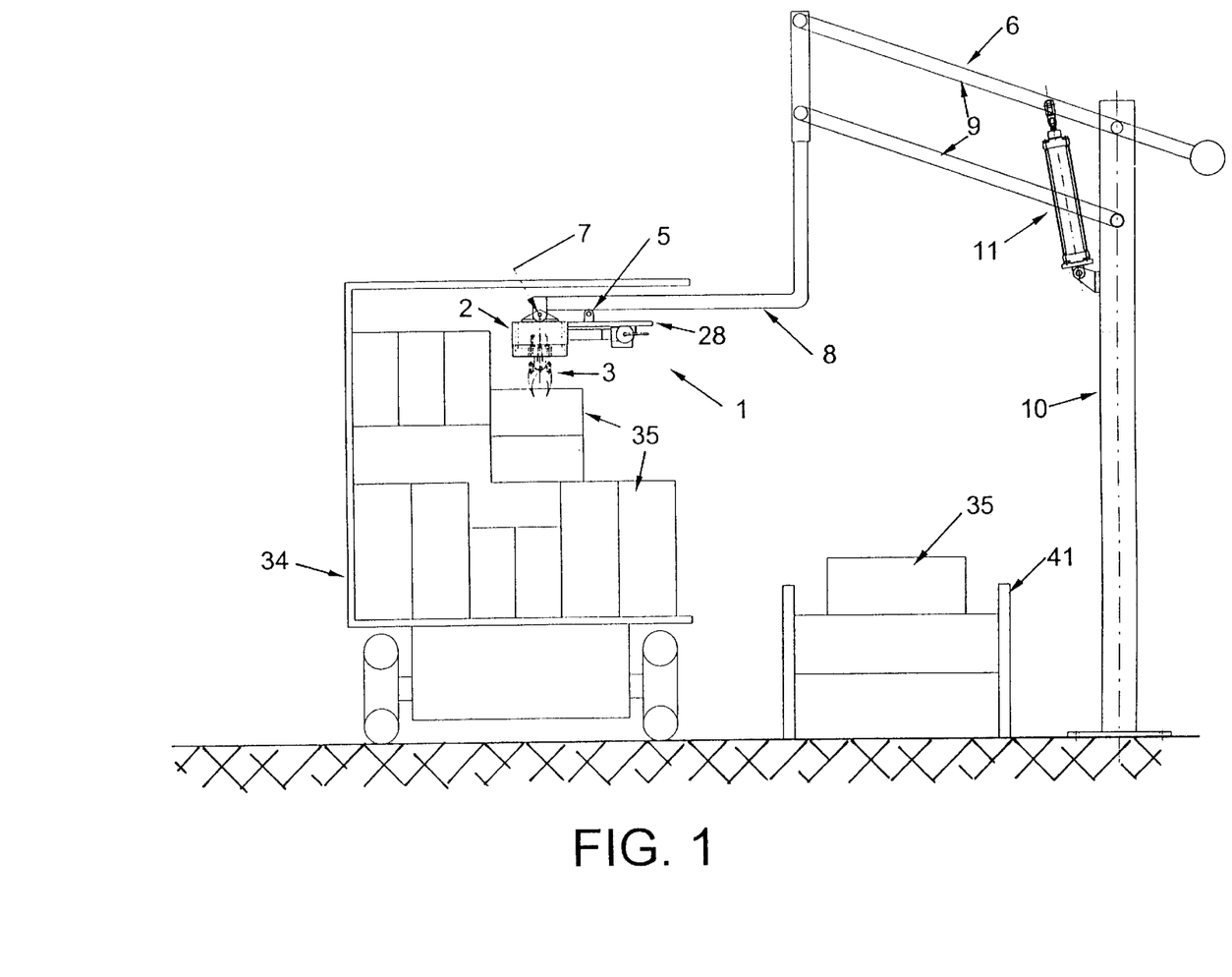
FIG. 1 is a diagrammatic side elevation of a first embodiment of baggage handling device in accordance with the invention.
Figure 2:
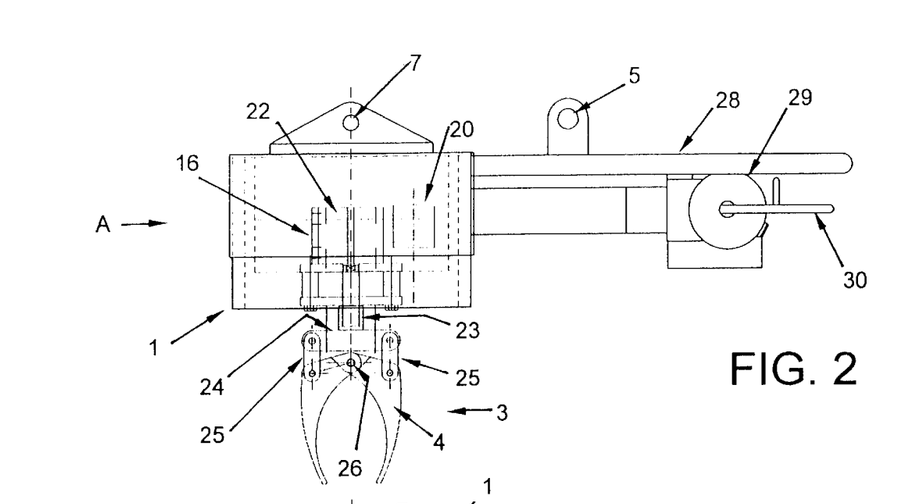
FIG. 2 is a view to an enlarged scale of a portion of the device of FIG. 1 with the claws deployed.
Figure 3:
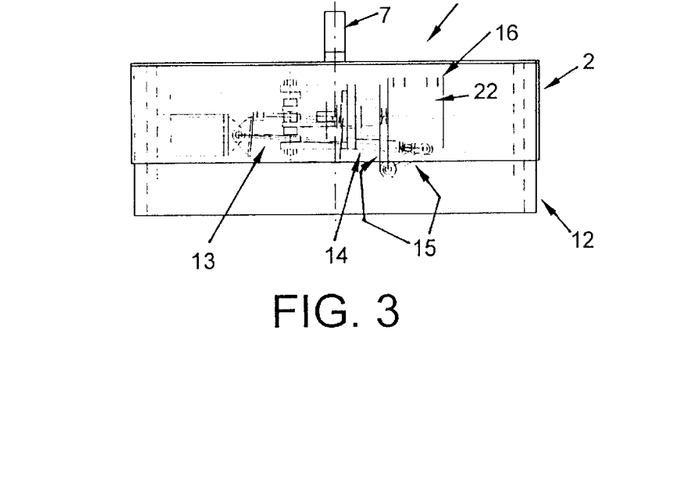
FIGS. 3 is a view of FIG. 2, in the direction of arrow A, with the claws retracted.
Figure 4:
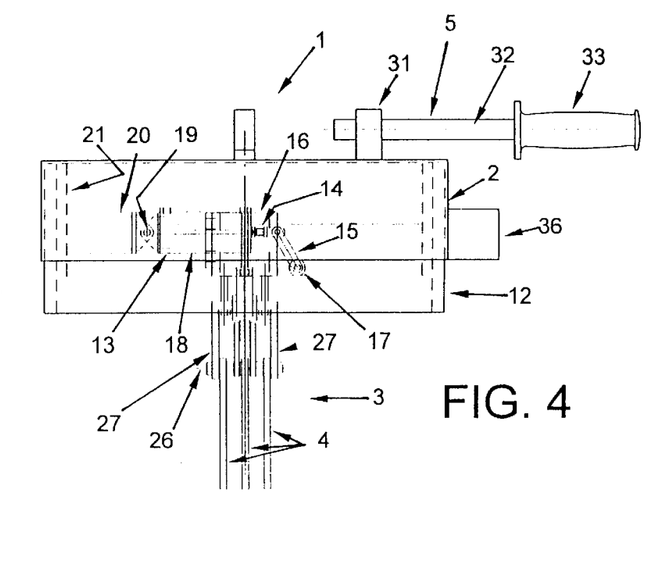
FIG. 4 corresponds to FIG. 3, but shows the claws deployed.

In detail, the suction foot 2 terminates at its lower end in a flexible skirt 12, the suction foot 2 being elongated (in contrast to being circular) as can be appreciated from a comparison of FIGS. 2 and 3. Within the foot 2 the device 3 can be completely housed, as indicated in FIG. 2, in its non-deployed position, when the foot 2 is required for baggage handling. The mechanical device 3 is rotatable through 90° from its retracted position of FIG. 3, to its deployed position of FIG. 4 (and FIGS. 1 and 2) by a double-acting pneumatic piston and cylinder unit 13, the piston rod 14 of which is connected to a bell-crank 15 carrying support structure 16 for the claws 4, and pivotable about axis 17, whilst the cylinder 18 of the unit 13 is pivotably attached at 19 to an arm 20 in turn attached to an internal wall 21 of the foot 2.

The support structure 16 incorporates a double-acting piston and cylinder unit 22, the piston rods 23 of which extends to a transverse arm 24 to which two pivot links 25 (see FIG. 2) are pivotally attached, the links 25 also being pivotally attached to claws 4, which are mounted on a fixed position pivot 26 carried by a pair of spaced-apart arms 27 attached, indirectly to the support structure 16.

The duplex unit 2, 3, is manually manoeuvrable by a looped tubular handle 28 fixed externally to the foot 2 in a known manner, with a known rotary vacuum control valve 29 with an operating lever 30. On opposite arms of the looped handle 28 two journals 31 are provided for a rod 32 terminating in a twist grip handle 33, manual rotation of the twist grip causing activation of the piston and cylinder unit 13 either to retract, or to deploy the mechanical device 3, as required. A push button (not shown) may cause activation of the piston and cylinder unit 22 for activation of the claws 4, or this may be achieved by a further degree of twist.

FIG. 1 also shows how the duplex unit 2, 3, may be manoeuvred into a typical airport-type baggage container 34 carrying items of baggage 35 of various shapes and sizes, some of which are appropriate for engagement by the vacuum foot 2, and other by the mechanical device 3.

As an alternative to selection for use of the foot 2 or device 3 by an operator, the foot 2 may carry a sensor 36, which may be a sonic and/or proximity and/or photoelectric device and/or a vision and camera system, whereby the shape and size of an item of baggage 35 is conveyed to a memory of an associated computer, the memory of which contains a library of baggage shapes and sizes, whereby the computer dictates selection of the foot 2 or the device 3 for an item of baggage 35 under observation by the sensor 36.

Figure 5:
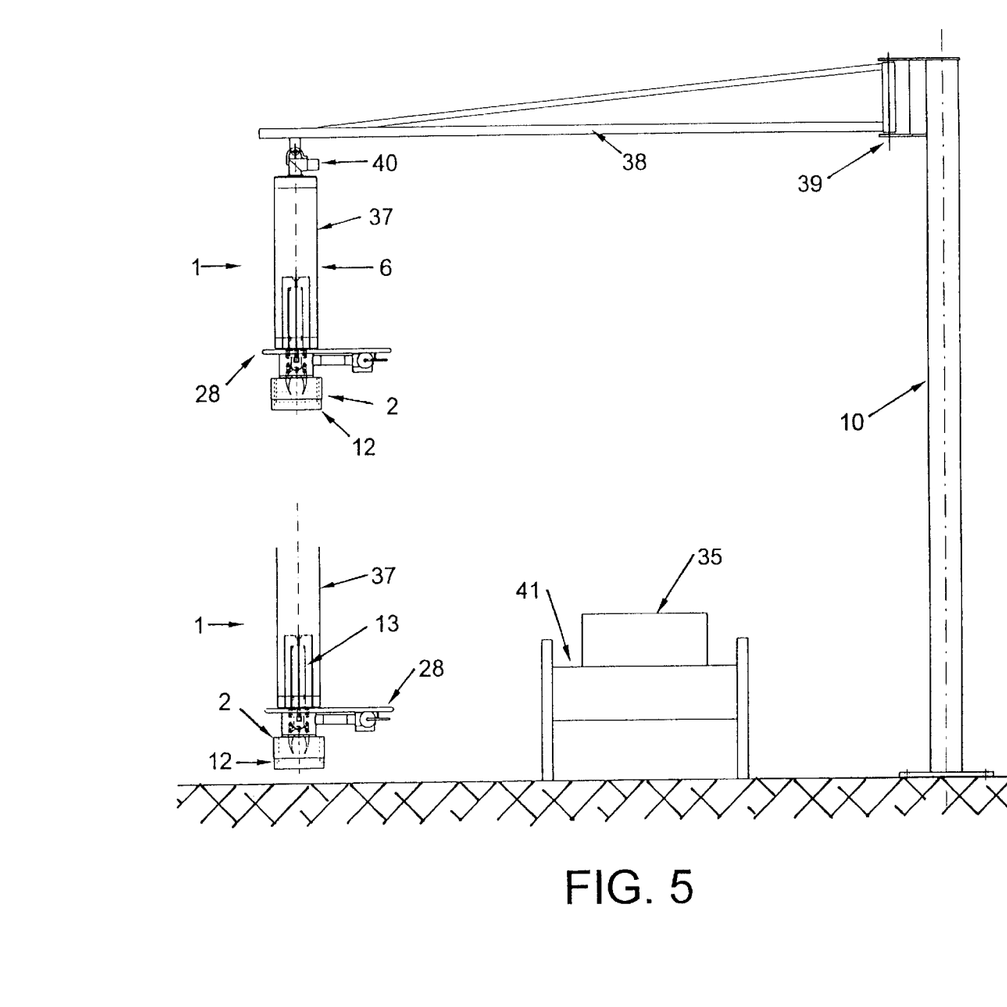
FIG. 5 is a diagrammatic side elevation of a second embodiment of baggage handling device in accordance with the invention.
Figure 6:
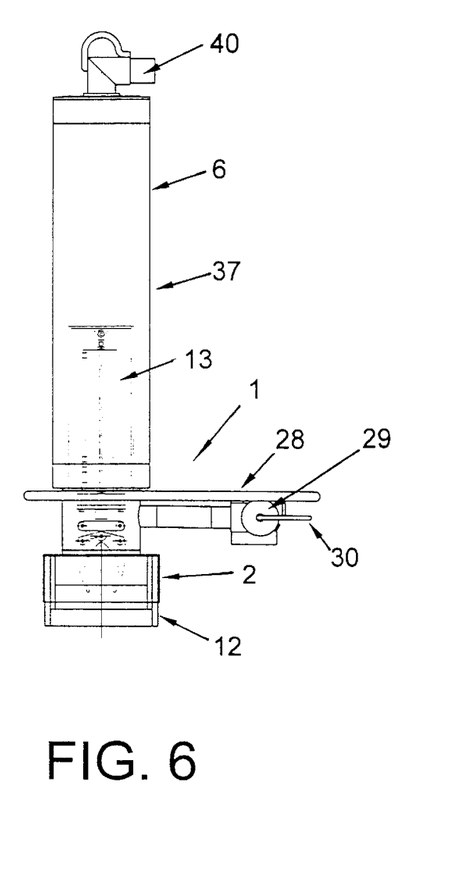
FIG. 6 is a view, to an enlarged scale, of a portion of FIG. 5, with the claws retracted.
Figure 7:
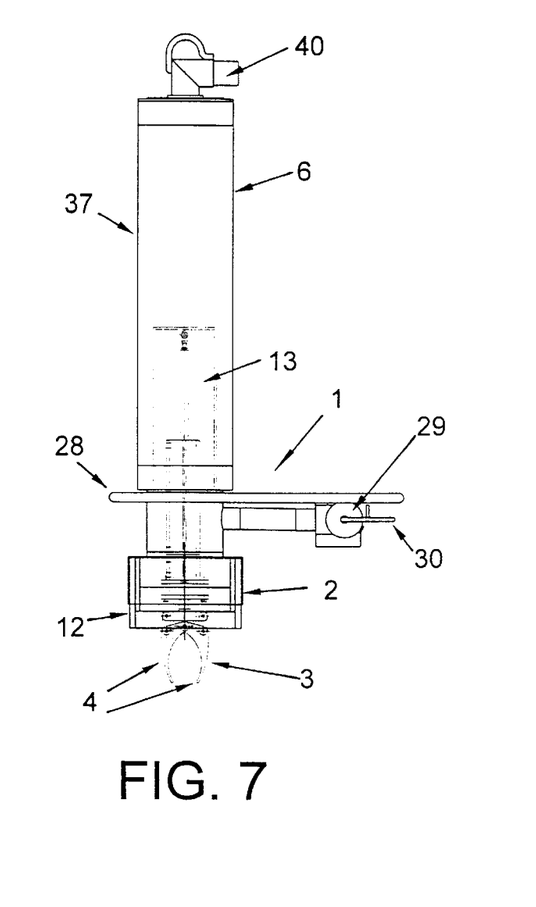
FIG. 7 corresponds to FIG. 6, but shows the claws deployed.
Figure 8:
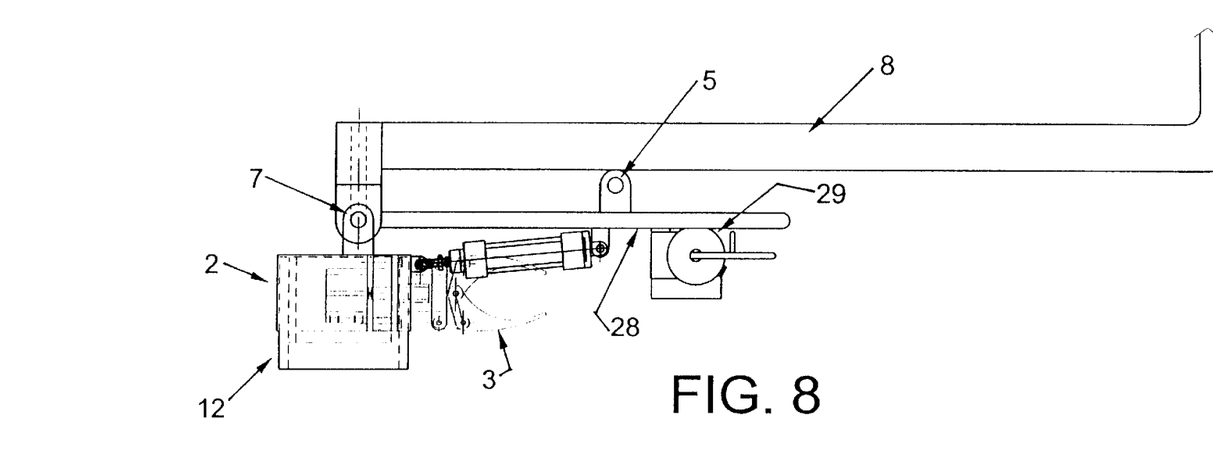
FIGS. 8 and 9 show an alternative embodiment to FIGS. 2 to 4, with FIG. 8 indicating use of the vacuum foot and FIG. 9 use of the mechanical device.

In the embodiment of FIGS. 5 to 7, the powered hoisting means 6 illustrated is of the type described in GB 2080764, comprising a variable length rube 37 subjectable to a vacuum and carries at its lower end the duplex unit 2, 3. The means 6 is pivotally suspended from an arm 38 attached to pillar 10 and pivotable about axis 39, a (known) vacuum connection duct being indicated at 40.

Figure 9:
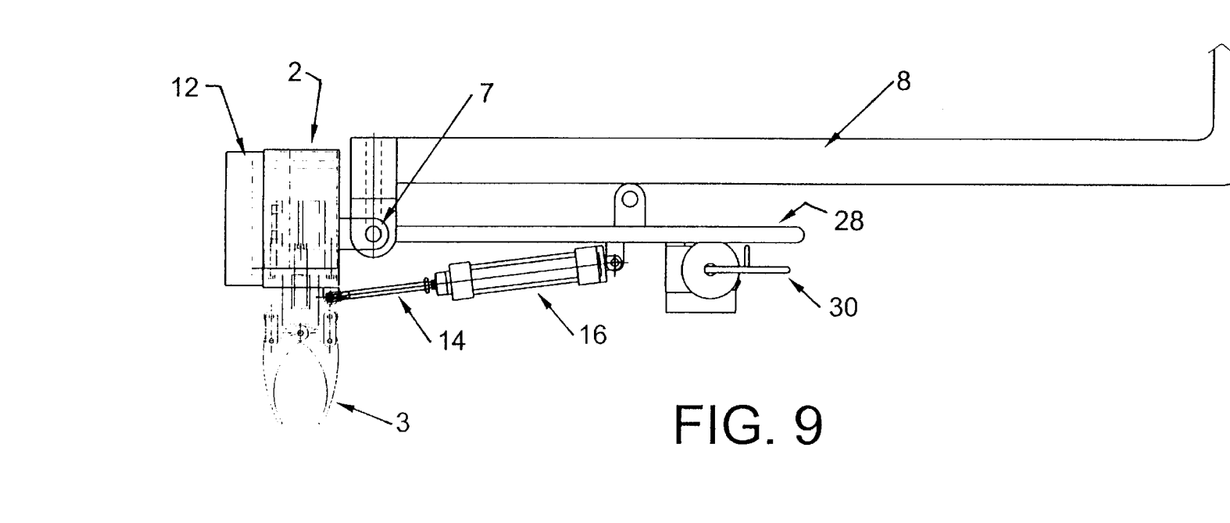

In the embodiment of FIG. 9, the duplex unit 2, 3, is pivotable through 90° by means of piston and cylinder unit 16, depending on whether the vacuum foot 2 or the mechanical device 3 is to be employed for gripping a particular item of baggage 35.

Figure 10:
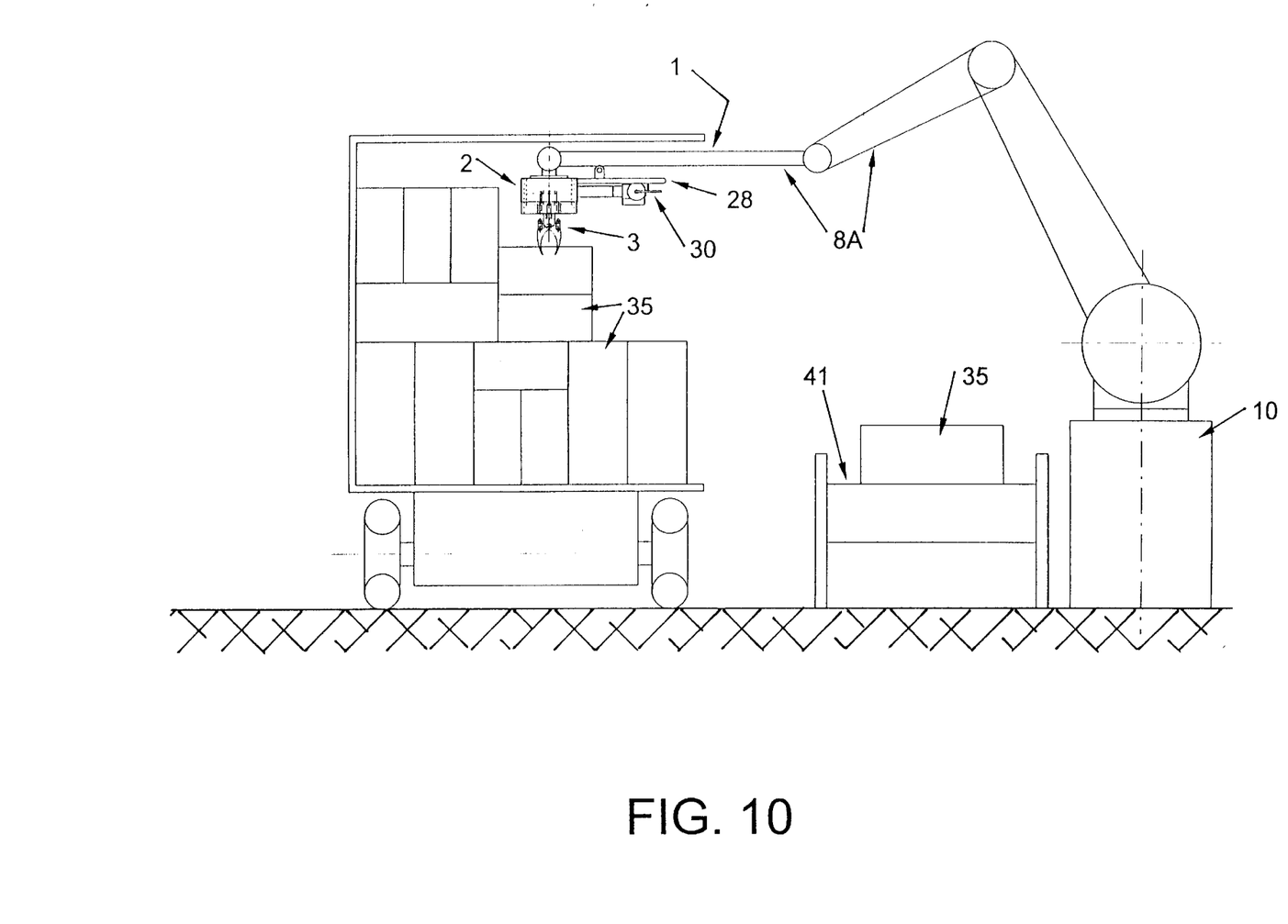
FIG. 10 shows a device supported from a robot arm attached to the floor.

FIG. 10, the duplex unit 2, 3, is articulated to a robot arm 8A in turn articulated to a pillar 10, with items of baggage 35 being transferred to and from an associated belt conveyor 41.

Figure 11:
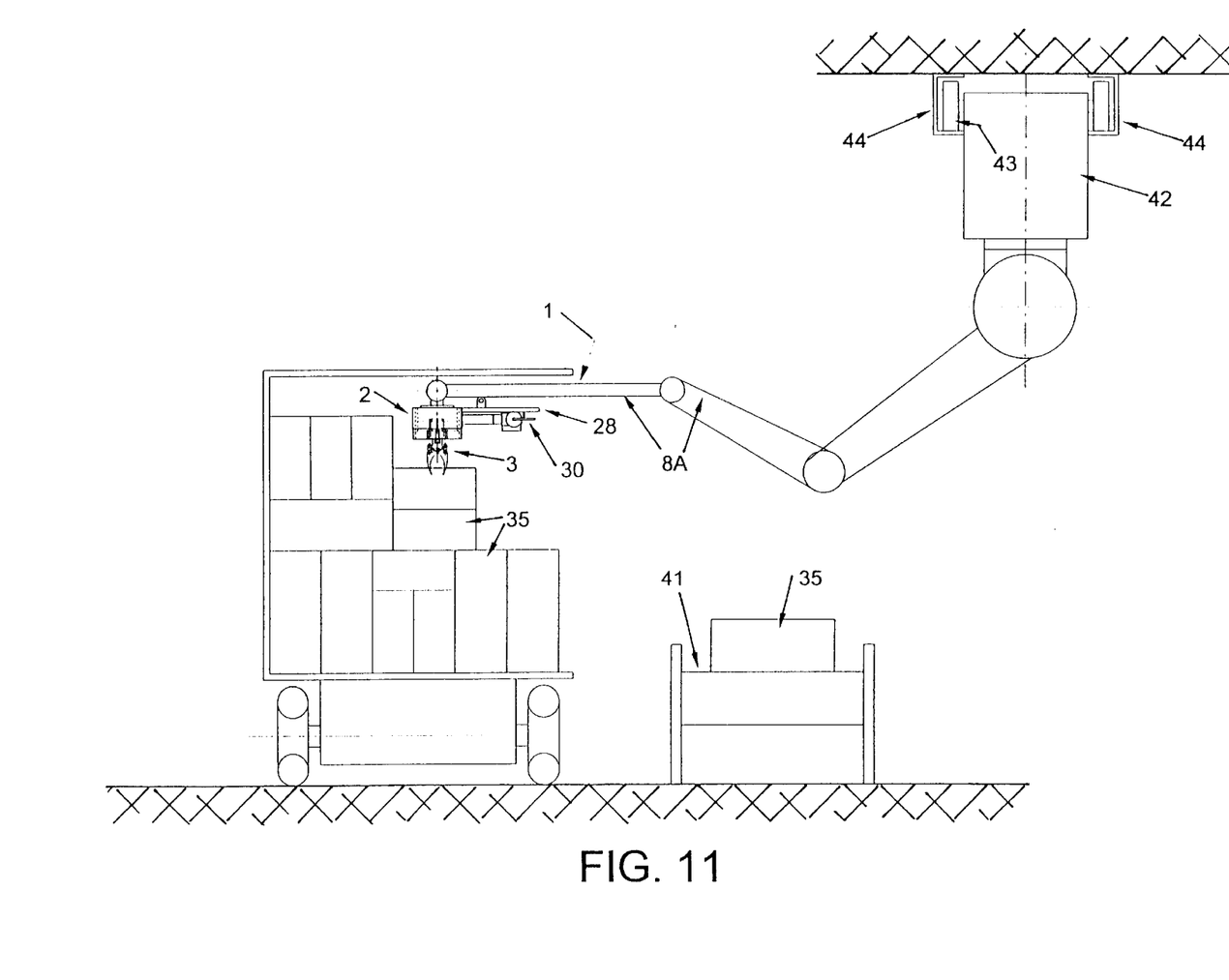
FIGS. 11 and 12 correspond to FIG. 10 but show a device supported from a robot arm supported from an elevated, rail mounted carriage.
Figure 12:
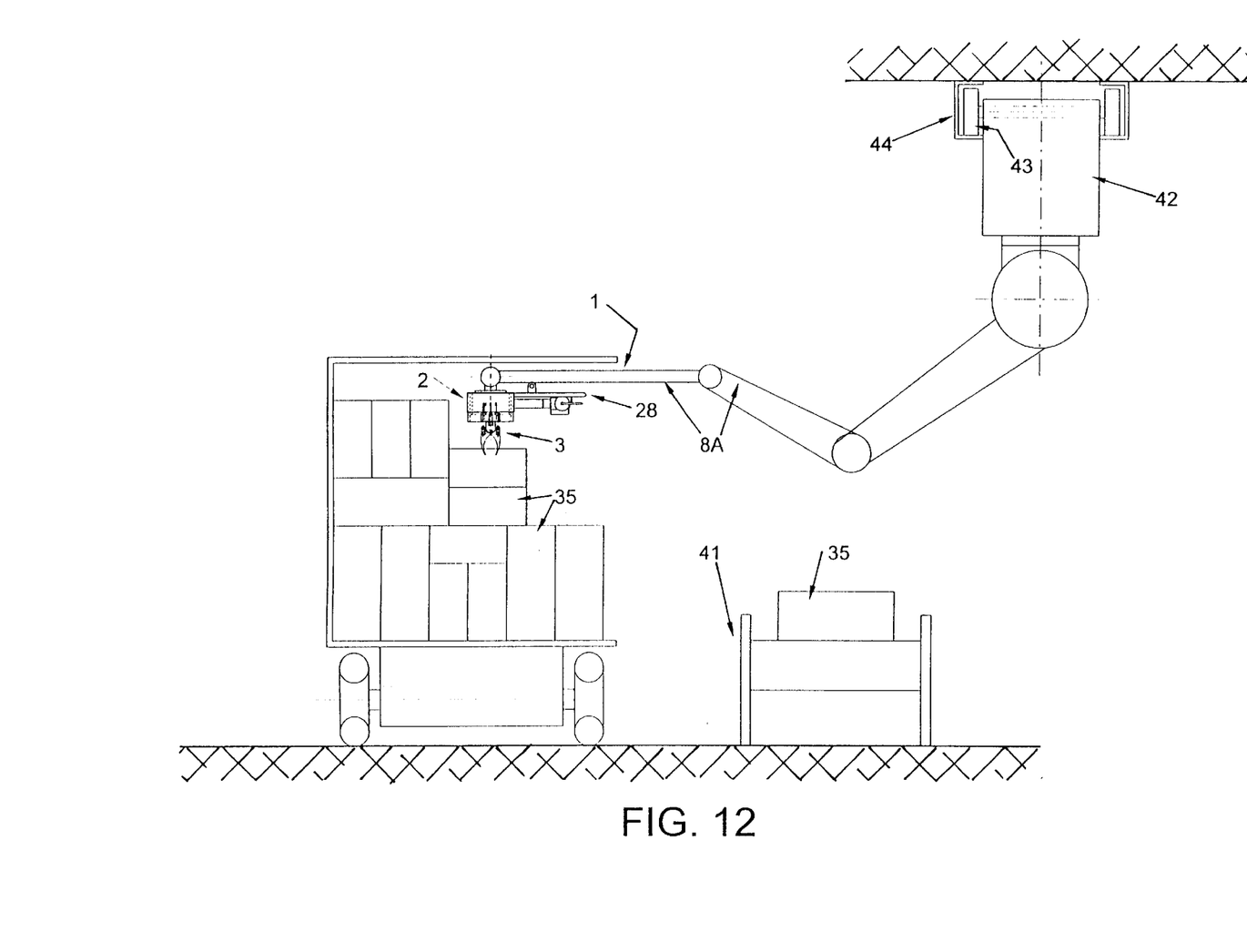

In FIGS. 11 and 12, the robot arm 8A is articulated to an elevated carriage 42 displaceable along the length of the belt conveyor 41 by means of wheels 43 captivated in "C"-shaped rails 44.

What I claim is:

1. A baggage handling device comprising a support arm, a gripping head carried by said support arm, said gripping head comprising a vacuum gripping foot and a non-vacuum, mechanical gripping device, with means to select either said vacuum gripping foot, or said mechanical gripping device as appropriate, for gripping any particular item of baggage, a powered lifting means to raise and lower said gripping head, as necessary in a baggage handling sequence of gripping, maneuvering and releasing, wherein said gripping head is attached to said support arm for pivotal movement about a horizontal axis, and power rotating means is provided to rotate said gripping head about said horizontal axis, and an item of baggage gripped by said gripping head.

2. A device as claimed in claim 1, wherein said support arm is "L"-shaped.

3. A device as claimed in claim 1, wherein said support arm is connected to said powered lifting means.

4. A baggage handling device as claimed in claim 1, wherein said powered rotating means is activated after activation of said powered lifting means.

5. A baggage handling device comprising, in combination, a vacuum gripping foot and a non-vacuum, mechanical engagement device, with means to select either said vacuum gripping foot, or said mechanical device as appropriate, for engaging any particular item of baggage; with a powered lifting means to raise and lower said vacuum foot and mechanical device, wherein said powered lifting means is a vacuum lifting device, wherein said powered lifting means comprises a variable length lift tube subjectable to a vacuum and terminating at its lower end in said vacuum gripping foot adapted to engage the item of baggage, with a maneuvering handle and a control valve, hand-operable by the user to maintain, partially destroy, or fully destroy, the vacuum within the lift tube, depending on the function required of said lift tube, and wherein said mechanical device is a power operated claw which, in its non-operative, storage position, is located within a lower end of said lift tube, being co-axial therewith.

6. A device as claimed in claim 5, wherein said device is fully manually operable and manually maneuverable in its baggage handling sequence of gripping, maneuvering and releasing.

7. A device as claimed in claim 5, wherein said mechanical device is displaceable between an inactive, storage position and a deployed, operable position.

8. A device as claimed in claim 7, wherein said displacement is by power means.

9. A device as claimed in claim 8, wherein said power means is a piston and cylinder unit.

10. A device as claimed in claim 5, wherein said mechanical engagement device is a power operated claw.

11. A device as claimed in claim 10, wherein, said powered claw comprises at least two oppositely disposed claws subjectable to a powered drive mechanism, operable by the user, to enable them to be powered between closed and open positions, to grip and release an item of baggage.

12. A device as claimed in claim 11, wherein three interdigitating claws are provided and are simultaneously drivable between the open and closed positions.

13. A device as claimed in claim 5, wherein a sensor type device and/or vision and camera system is mounted on or adjacent said duplex unit with information passed to a monitor for manual control, or to a computerised control system incorporating a memory unit capable of comparing and interpreting information, for fully automatic control.

14. A device as claimed in claim 13, wherein said recognition means incorporates at least one sonic sensor.

15. A device as claimed in claim 5, wherein user-operable control means for deploying said claw, comprises a twist grip.

* * * * *